US012781109B2

(12) United States Patent
Travis et al.

(10) Patent No.: US 12,781,109 B2
(45) Date of Patent: Nov. 3, 2026

(54) POLYMERISABLE RESIN FILM

(71) Applicant: Gurit (UK) Ltd., Hampshire (GB)

(72) Inventors: Will Travis, Hampshire (GB); Ben Creaser, Hampshire (GB)

(73) Assignee: Gurit (UK) Ltd., Hampshire (GB)

(*) Notice: Subject to any disclaimer, the term of this patent is extended or adjusted under 35 U.S.C. 154(b) by 310 days.

(21) Appl. No.: 18/580,212

(22) PCT Filed: Aug. 2, 2022

(86) PCT No.: PCT/EP2022/071743
§ 371 (c)(1),
(2) Date: Jan. 18, 2024

(87) PCT Pub. No.: WO2023/012183
PCT Pub. Date: Feb. 9, 2023

(65) Prior Publication Data

US 2024/0318055 A1 Sep. 26, 2024

(30) Foreign Application Priority Data

Aug. 2, 2021 (GB) ....................................... 2111125

(51) Int. Cl.

| | |
|---|---|
| ***C09J 163/00*** | (2006.01) |
| ***B32B 5/02*** | (2006.01) |
| ***B32B 7/06*** | (2019.01) |
| ***B32B 29/02*** | (2006.01) |
| ***C08G 59/12*** | (2006.01) |
| ***C09J 7/30*** | (2018.01) |

(52) U.S. Cl.
CPC ............ *C09J 163/00* (2013.01); *B32B 5/022* (2013.01); *B32B 5/024* (2013.01); *B32B 7/06* (2013.01); *B32B 29/02* (2013.01); *C08G 59/12* (2013.01); *C09J 7/30* (2018.01); *B32B 2255/02* (2013.01); *B32B 2255/26* (2013.01); *B32B 2262/0276* (2013.01); *B32B 2307/5825* (2013.01); *B32B 2307/718* (2013.01)

(58) Field of Classification Search
None
See application file for complete search history.

(56) References Cited

U.S. PATENT DOCUMENTS 5,470,413 A 11/1995 Cedarleaf
10,538,638 B2 * 1/2020 Jones ....................... C08J 5/243
2004/0127680 A1 * 7/2004 Chabut ............... C08F 290/064 528/408
2006/0154039 A1 7/2006 Suzuki
2012/0261060 A1 * 10/2012 Jones ....................... C08J 5/246 156/196
2013/0012086 A1 1/2013 Jones
2024/0247119 A1 * 7/2024 Travis ........................ C08J 5/24

FOREIGN PATENT DOCUMENTS

JP 2006232903 A 9/2006
JP 4230466 B2 * 2/2009
WO 2011/073111 A1 6/2011
WO 2019/126314 A1 6/2019

OTHER PUBLICATIONS

Machine translation of JP 4230466 B2 (Year: 2009).*
Andreas Kandelbauer et al., "Unsaturated Polyesters and Vinyl Esters", Handbook of Thermoset Plastics, Elsevier Inc., 2014 (Year: 2014).*
Combined Search and Examination Report under Sections 17 and 18(3) in related GB Application No. 2111125.7 issued on Feb. 7, 2022.
International Search Report and Written Opinion in related international application PCT/EP2022/071743 issued on Nov. 28, 2022.

* cited by examiner

*Primary Examiner* — Anish P Desai
(74) *Attorney, Agent, or Firm* — POLSINELLI PC

(57) ABSTRACT

A resin film with at least 50 wt % of at least one polymerisable vinyl ester prepolymer having at least two carbon-carbon unsaturated functional groups and a curing system, the prepolymer in a concentration of at least 10 wt %, based on the weight of the polymerisable resin, and has the structure $R1_n$-R2-$R1'_m$, wherein R1 and R1' are the same or different, n and m are each at least one and may be the same or different, and each of R1 and R1' includes a carbon-carbon unsaturation at a free end thereof remote from R2, and includes a residue of an epoxy resin, and wherein R2 is a polyfunctional chain extending linker between R1 and R1', and is derived from a polyfunctional carboxylic acid having the structure R-$Fn_x$, where Fn is a carboxylic acid functional group, x is at least 2, and R comprises an organic moiety having aliphatic, araliphatic, cycloaliphatic, heterocyclic and/or aromatic groups, containing any type and/or combination of saturated, unsaturated and/or aromatic carbon bonds, and wherein R may be unsubstituted or substituted by functional groups and/or heteroatoms.

24 Claims, 2 Drawing Sheets

POLYMERISABLE RESIN FILM

FIELD OF THE INVENTION

The present invention relates to a resin film comprising a layer of polymerisable resin. The present invention also relates to a method of manufacturing a fibre-reinforced composite material using such a resin film. In particular, the present invention relates to resin films for manufacturing fibre-reinforced composite materials in which a solid resin film can be used to provide a curable resin for combining with a fibrous reinforcement material, instead of the use of prepregs or a liquid resin infusion process.

BACKGROUND

It is well known in the art of manufacturing fibre-reinforced composite materials to combine a curable resin with fibrous reinforcement material in a mould prior to curing the resin. It is also well known that two alternative known processes may be used to achieve such a combination, in particular the use of prepregs or a liquid resin infusion process.

Prepregs comprise a fibrous reinforcement material which has previously been impregnated with a desired quantity of resin to provide a pre-set weight ratio between the fibres and the resin, and the resin is in a substantially solid form, and typically has been partly cured so as to be "B-staged" and thereby exhibit an increased viscosity. The prepregs are laid up in the mould, and then the resin is heated, to cause the resin to liquefy and thereby flow to wet-out the fibres, and then the resin is subsequently cured.

A liquid resin infusion process provides dry fibrous reinforcement material in the mould, and then liquid resin is introduced into the mould, typically under vacuum in a process called vacuum assisted resin transfer moulding (VARTM), to wet-out the fibres, and then the resin is subsequently cured.

These known processes may be used for manufacturing large mouldings, such as wind turbine blades and marine parts such as boat hulls.

As a general rule, for manufacturing such large mouldings, prepregs provide the advantage of increased control of the distribution of the resin as compared to a liquid resin infusion process, but have the disadvantage of increased material cost.

Historically, wind turbine blades have been manufactured using either prepregs or a liquid resin infusion process. Currently, wind turbine blade producers are increasingly moving away from the use of prepregs to the use of liquid infusion of an epoxy resin. The primary reason is cost reduction. However, liquid infusion brings several disadvantages, for example increased parasitic resin weight, undesired resin uptake by the core of the blade, and a higher risk of product or manufacturing failure.

For the manufacture of large marine parts, such as boat hulls, currently boat manufacturers typically using polyester or vinyl ester resins in wet-layup processes. However, the mechanical performance of such resins is generally low compared to the mechanical performance of epoxy resins. Also, these resins exhibit poor safety performance during fabrication, for example by emitting fumes. The alternative use of epoxy resin prepregs would increase manufacturing cost, and may require the need to procure new higher temperature tooling and oven systems.

Consequently, there is a need to provide an improved resin system for the manufacture of fibre-reinforced composite materials, in particular large parts such as wind turbine blades and marine parts such as boat hulls, which can provide the combination of ease of manufacture, low manufacturing cost with regard to materials and manufacturing apparatus, and good mechanical performance of the resultant composite material product.

As an alternative process which has nevertheless not been known for the manufacture of large composite parts, the construction of composite material laminates using solid resin films layered with dry reinforcement is historically known. The resin films comprise a single component resin, known in the art as a "1K" resin. However, there is no disclosure of such resin films which can reliably be used to manufacture large composite material parts, as discussed above.

SUMMARY OF THE INVENTION

The present invention aims to provide a solid resin film which has particular use in the manufacture of large composite material parts and structures.

The present invention aims to provide a solid resin film which can provide the combination of ease of manufacture, low manufacturing cost with regard to materials and manufacturing apparatus, and good mechanical performance of the resultant composite material product, and in particular can provide improved performance as compared to the use of prepregs or liquid resin infusion for the manufacture of large composite material parts and structures.

The present invention aims to provide a solid resin film, and an associated method of manufacturing fibre-reinforced composite materials, in which the solid resin film can be used to provide a curable resin for combining with a fibrous reinforcement material, instead of the use of prepregs or a liquid resin infusion process, in particular for the manufacture of large composite material parts and structures.

In a first aspect, the present invention provides a resin film comprising a layer of polymerisable resin which is in the form of a solid layer at 20° C., at least 50 wt % of the polymerisable resin comprising at least one polymerisable vinyl ester prepolymer having at least two carbon-carbon unsaturated functional groups, the prepolymer being polymerisable by reaction of the unsaturated functional groups to form a cured resin, wherein the polymerisable resin further comprises a curing system for polymerizing the polymerisable vinyl ester prepolymer, wherein the at least one polymerisable vinyl ester prepolymer comprises at least one prepolymer which is present in a concentration of at least 10 wt %, based on the weight of the polymerisable resin, and has the structure $R1_n$-R2-$R1'_m$, wherein R1 and R1' are the same or different, n and m are each at least one and may be the same or different, and each of R1 and R1' includes a carbon-carbon unsaturation at a free end thereof remote from R2, and includes a residue of an epoxy resin, and wherein R2 is a polyfunctional chain extending linker between R1 and R1', and is derived from a polyfunctional carboxylic acid having the structure R-$Fn_x$, where Fn is a carboxylic acid functional group, x is at least 2, and R comprises an organic moiety having aliphatic, araliphatic, cycloaliphatic, heterocyclic and/or aromatic groups, containing any type and/or combination of saturated, unsaturated and/or aromatic carbon bonds, and wherein R may be unsubstituted or substituted by functional groups and/or heteroatoms.

In a second aspect, the present invention provides a resin film comprising a layer of polymerisable resin which is in the form of a solid layer at 20° C., at least 50 wt % of the polymerisable resin comprising at least one polymerisable vinyl ester prepolymer having at least two carbon-carbon unsaturated functional groups, the prepolymer being polymerisable by reaction of the unsaturated functional groups to form a cured resin, wherein the polymerisable resin further comprises a free-radical curing system for polymerizing the polymerisable vinyl ester prepolymer, wherein the free-radical curing system comprises at least one peroxide curing agent having a self-accelerating decomposition temperature within the range of from 45 to 95° C., wherein the at least one peroxide curing agent is present in a concentration of from 0.1 to 3 parts per hundred based on the weight of the polymerisable vinyl ester prepolymer.

In a third aspect, the present invention provides a resin film comprising a layer of polymerisable resin which is in the form of a solid layer at 20° C., at least 50 wt % of the polymerisable resin comprising at least one polymerisable vinyl ester prepolymer having at least two carbon-carbon unsaturated functional groups, the prepolymer being polymerisable by reaction of the unsaturated functional groups to form a cured resin, wherein the polymerisable resin further comprises a curing system for polymerizing the polymerisable vinyl ester prepolymer, wherein the polymerisable resin in the resin film, the polymerisable resin additionally comprising the curing system, has (i) a cold Tg of from −10 to 15° C., measured using a dynamic oscillatory measurement within a temperature range of −10 to 40° C. at a ramp rate of 2° C./minute, (ii) a phase angle (δ) Tonset delta between a storage modulus and a loss modulus of from −5 to 15° C., measured using a dynamic oscillatory measurement within a temperature range of −10 to 40° C. at a ramp rate of 2° C./minute, and (iii) a storage modulus and a loss modulus which are equal within a temperature range of from 70 to 110° C., measured using a dynamic oscillatory measurement within a temperature range of 30 to 130° C. at a strain of 0.125%, and ramp rate of 1° C. A suitable machine for such testing to determine these rheological properties of Cold Tg, phase angle, storage modulus and loss modulus is a TA Instruments AR2000 rheometer, fitted with a 20 mm steel plate geometry and Peltier temperature control system.

In a fourth aspect, the present invention provides a method of manufacturing a fibre-reinforced composite material, the method comprising:

(i) providing a layer of a fibrous reinforcement material;

(ii) positioning a resin film according to the present invention adjacent to the layer of fibrous reinforcement material to form a laminate between the resin film and the layer of fibrous reinforcement material;

(iii) increasing the temperature of the laminate to an elevated temperature to cause the polymerisable resin to melt and flow into the layer of fibrous reinforcement material thereby to wet-out the fibres in the fibrous reinforcement material; and (iv) polymerising the monomer at a curing temperature which is at least as high as the elevated temperature to form a cured resin matrix containing the fibrous reinforcement material.

The preferred embodiments of the present invention can provide a resin film which is in the form of a solid layer at 20° C., and an associated method of manufacturing fibre-reinforced composite materials which causes the resin film to melt and flow into a layer of fibrous reinforcement material thereby to wet-out the fibres in the fibrous reinforcement material, i.e. an infusion process, which can achieve the process and performance advantages of the use of prepregs but at a low material cost substantially corresponding to the cost of a liquid resin infusion process, and with the additional benefits of faster cycle times as compared to a typical liquid resin infusion process.

For the manufacture of large marine parts, the preferred embodiments of the present invention can further provide the advantage that volume boat producers typically currently using polyester or vinyl ester wet-lay processes can readily modify the production process to achieve increased product performance with regard to mechanical properties, similar to the performance achievable by epoxy resin prepregs, but without the increase in cost or the need to procure new higher temperature tooling and oven systems that would be required with the use of prepregs.

BRIEF DESCRIPTION OF THE DRAWINGS

Embodiments of the present invention will now be described by way of example only, with reference to the accompanying drawings, in which.

DETAILED DESCRIPTION

Figure 1:
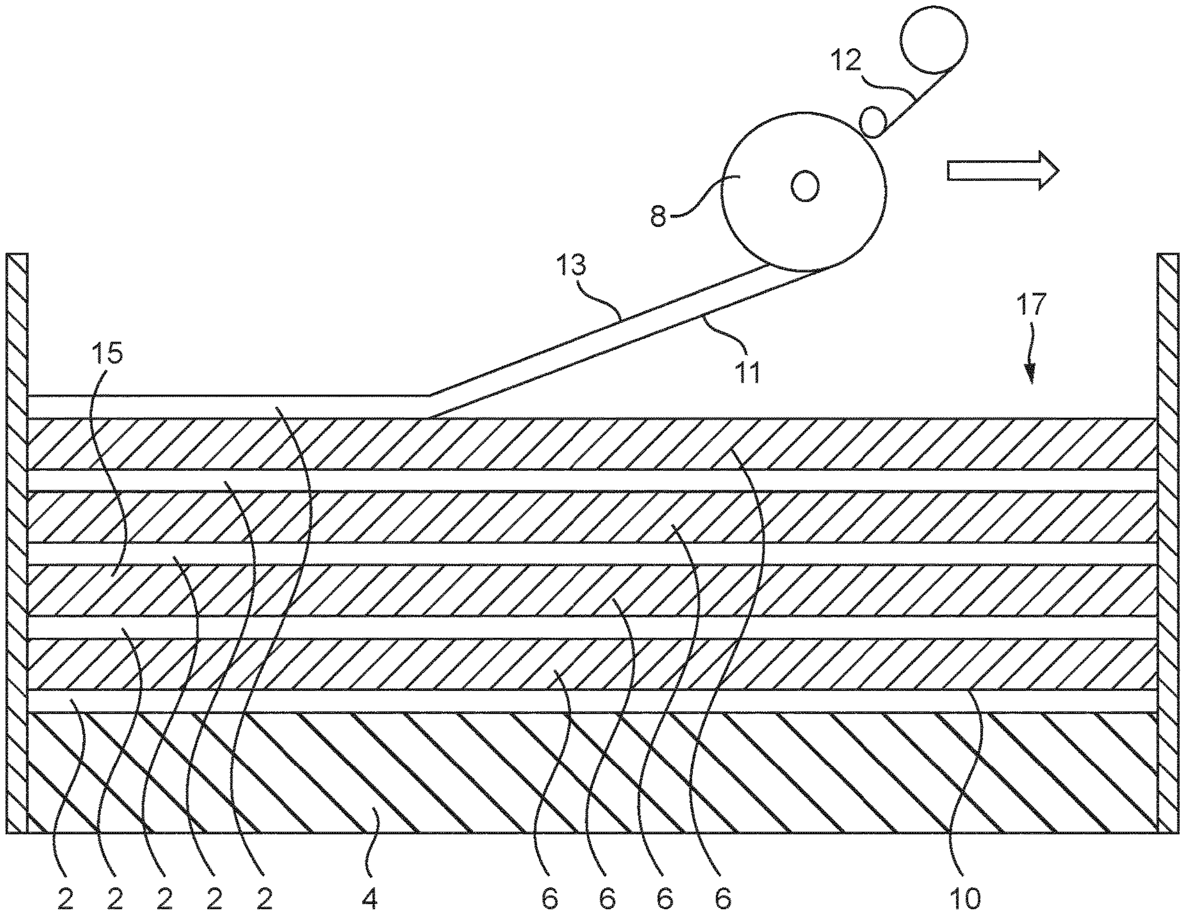
FIG. 1 is a side cross-sectional view which schematically illustrates the use of a resin film in accordance with an embodiment of the present invention in a method of manufacturing a fibre-reinforced composite material.
Figure 2:
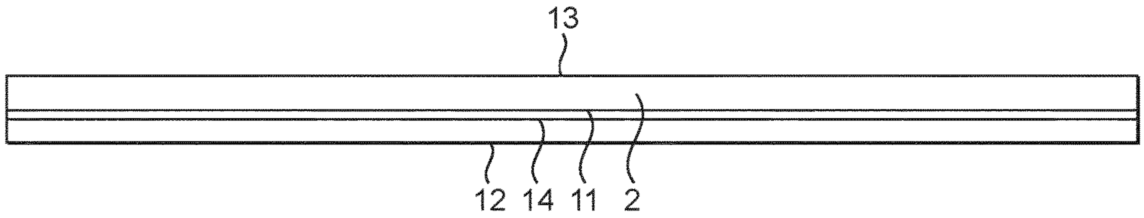
FIG. 2 is a side cross-sectional view which schematically illustrates an embodiment of the resin film of FIG. 1.
Figure 3:
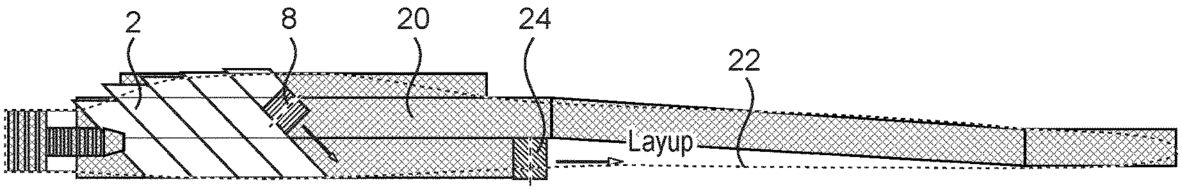
FIG. 3 is a plan view of the layup of a resin film in accordance with an embodiment of the present invention in a method of manufacturing a wind turbine blade composed of a fibre-reinforced composite material.

The drawings of FIGS. 1 to 3 are highly schematic and are not drawn to scale, and some dimensions are exaggerated for the sake of clarity of illustration.

Referring to FIG. 1, there is shown the use of a resin film 2 in accordance with an embodiment of the present invention in a method of manufacturing a fibre-reinforced composite material. As described in detail hereinbelow, typically the resin film is applied as a layer directly to the moulding surface of the required composite tool and then a layer of glass, carbon or other reinforcing fabric is applied over the resin layer. Alternatively, the first layer deposited onto the moulding surface may be a layer of glass, carbon or other reinforcing fabric, and then the resin film is applied over the glass etc layer, which may enhance the air-free quality of the resultant laminate. This layering process, which may be caried out manually or automatically by a robot, is repeated to construct a laminate of a desired thickness which is then consolidated with pressure or vacuum and cured using heat.

The alternate layering of a solid resin film and fibrous reinforcing material to form an alternating laminate structure distinguishes the method of manufacturing a fibre-reinforced composite material from the use of solid prepregs and the infusion of a liquid resin, from outside the mould cavity, into a stack of dry fibrous reinforcement material.

The resin film 2 is in the form of a solid layer, which is solid at 20° C., and typically solid over a broad temperature range which includes the typical ambient or room temperature value of 20° C. and encompasses a working range for use of the resin film 2 in the manufacturing method. Typically, the resin film is solid at temperatures up to 40° C.

Typically, during the method the resin film 2 is heated to a temperature above the melting temperature of the resin to form a liquid which then flows to wet-out the fibres of a fibrous reinforcement material. Then the resin is cured to form a cured resin matrix containing the fibrous reinforcement material. This forms a fibre-reinforced resin matrix composite material during the moulding of large composite part, for example a wind turbine blade or a marine vessel.

As shown in FIGS. 1 and 2, a mould 4 is provided. Layers of fibrous reinforcement material 6 are laid up in the mould 4. The fibrous reinforcement material 6 may be composed of any suitable fibres, for example glass fibres; carbon fibres or natural fibres such as flax fibre, which have been selected for the desired product comprised of fibre-reinforced resin matrix composite material which is to be manufactured. The fibrous reinforcement material 6 may also be in any desired form, for example a woven textile having any suitable weaving pattern, or a non-woven textile. In summary, the resin film 2 of the invention can be used with any type of fibrous reinforcement material 6 to manufacture the fibre-reinforced resin matrix composite material.

The resin film 2 is provided in the form of a wound roll 8 of an elongate length of the resin film 2. The resin film 2 is unwound from the roll 8 and laid over the surface of a layer of fibrous reinforcement material 6. The weight per unit area, and therefore the thickness, of the resin film 2 is selected to provide the desired weight ratio between the fibrous reinforcement material 6 and the cured resin in the resultant fibre-reinforced composite material.

In one embodiment, the resin film 2 is a coherent layer having first and second opposed resin surfaces 11, 13. The first and second opposed resin surfaces 11, 13 may be self-adhesive, which means that the surface have an intrinsic tack at the lay-up temperature, so that the resin adheres to the surface of the layer of fibrous reinforcement material 6. Such a resin film 2 may be provided in roll form with the successive layers of the resin film 2 in the roll 8 being in contact with each other.

As known to those skilled in the art, the degree of tack of a polymerisable resin can be controlled. Consequently, the tack may be controlled so that the roll 8 of the resin film 2 can readily be unwound.

In one embodiment, the resin film 2 is temporarily supported by a release backing layer 12, for example a siliconised paper or polymer layer, and one of the opposed resin surfaces is releasably adhered to the release backing layer 12. The resin film 2 is separated from the release backing layer 12 when the roll 8 is unwound to deliver the resin film 2 into the mould 4.

In some embodiments of the present invention, the resin of the resin film 2 has sufficient intrinsic tear strength that the resin film can be completely coherent and unsupported when delivered into the mould 4. The resin film 2 is preferably formulated to have sufficient tensile strength and tear strength so as not to distort or break during the end application to manufacture the composite material part.

However, in other embodiments of the present invention, in order to increase the tear strength, a very lightweight fibrous tissue or scrim may be co-laminated into the resin film 2. The fibrous tissue or scrim can provide the desired tear strength, without reducing other material or performance properties, or significantly increasing material cost.

Accordingly, in some embodiments, as shown in detail in FIG. 2, the resin film 2 is supported on a lightweight textile sheet 14 to which one of the opposed resin surfaces 11, 13 is adhered. Optionally, the resin of the resin film 2 may completely or partially impregnate the lightweight textile sheet 14. Typically, the lightweight textile sheet 14 has an areal weight of from 1 to 75 grams per square metre (gsm), optionally from 5 to 25 grams per square meter (gsm), and a tear strength of at least 500 N/m. The tear strength may be evaluated under the protocol of ASTM D624 using the calculation tear strength=tear load/thickness, the parameters being measured under ambient conditions (i.e. at a temperature of 20° C.).

The lightweight textile sheet 14 may comprise woven or non-woven polymeric fibres, for example polyester fibres. The material and areal weight of the lightweight textile sheet 14 are typically selected so as to provide substantially no modification to the mechanical properties of the resultant fibre-reinforced composite material. The lightweight textile sheet 14 is provided to enhance the tear strength of the resin film 2. The desired tear strength depends upon the specific manufacturing application and typically the dimensions of the component or structure to be manufactured.

Therefore, the resin film 2 is positioned adjacent to the layer of fibrous reinforcement material 6 to form a laminate 10 between the resin film 2 and the layer of fibrous reinforcement material 6. After the layer of the resin film 2 has been laid over the surface of the layer of fibrous reinforcement material 6, a subsequent layer of fibrous reinforcement material 6 is laid over the resin film 2. This sequence of steps is repeated so that a laminated stack 15 of alternating plies of fibrous reinforcement material 6 and resin film 2 is built up in the mould 4 until the desired total fibre weight, with the desired proportions by weight of fibrous reinforcement material and resin, has been achieved.

Then the mould 4 is then typically closed to contain the laminated stack 15 within the mould cavity 17. Thereafter, the temperature of the laminated stack 15 is increased to an elevated temperature to cause the polymerisable resin to melt and flow into the layers of fibrous reinforcement material 6 thereby fully to wet out the fibres in the fibrous reinforcement material 6.

Subsequently, the resin thereby dispersed uniformly throughout the mould cavity 17 is subjected to a polymerizing step in which the monomer is polymerized at a curing temperature, which is at least as high as the elevated temperature to wet-out the fibres, to form a cured resin matrix containing the fibrous reinforcement material 6.

Typically, the mould 4 is heated to a first elevated temperature, and optionally held at that temperature for a dwell time period, to cause complete wet-out of the fibres in the fibrous reinforcement material by the liquefied molten resin. During or prior to the heating, the laminate is consolidated with pressure or vacuum to ensure complete wet-out of the fibres. Thereafter, the mould 4 is heated to a second elevated temperature, which is higher than the first elevated temperature, which is a curing temperature. Preferably, the polymerization step is carried out by radical curing of unsaturated functional groups in the polymerisable resin by a free-radical curing system in the initial resin film 2. Typically, a peroxide radical curing is used to cure the unsaturated functional groups in the polymerisable resin. The mould 4 is then held at the curing temperature for a sufficient curing time period, to cause complete curing of the polymerisable resin.

Preferably, for the manufacture of large parts and structures such as wind turbine blades and marine vessels, the curing system is selected to exhibit a peak exotherm temperature within a desired temperature range. The peak exotherm temperature of any given curing system may be defined relative to the curing of a standard polymerisable resin having a specific monomer composition.

In particular, the curing system preferably exhibits a peak exotherm temperature of from 80 to 160° C., more preferably from 100 to 140° C., when evaluated via differential scanning calorimetry (DSC) to cure a model polymerisable resin consisting of a known commercially available methacrylate in place of the vinyl ester resin, used at equivalent parts by weight. In particular the model polymerisable resin consists of 2-hydroxyethyl methacrylate (also known as HEMA or BISOMER HEMA), having CAS number: 868-77-9) containing inhibitor MEHQ (4-methoxyphenol) at a concentration of 200 ppm by weight. Dynamic DSC evaluation of the curative system in the commercially available methacrylate BISOMER HEMA, is carried out over a temperature range of from 25 to 260° C. at a ramp rate of 10° C./min. A suitable machine for such DSC analysis is sold under the trade name "DSC 20" by TA Instruments, which uses a sample size, i.e. a total weight of the 2-hydroxyethyl methacrylate and the free-radical curing system, of from 8 to 16 mg, is suitable the DSC analysis is carried out with the sample under a nitrogen environment. In the DSC evaluation using the model polymerisable resin, the free-radical curing system comprises at least one peroxide curing agent which is present in a total peroxide curing agent concentration of from 0.1 to 3 parts per hundred based on the weight of the 2-hydroxyethyl methacrylate.

As shown in FIG. 3, the resin film 2 according to some preferred embodiments of the present invention is used for the manufacture of wind turbine blades.

FIG. 3 is a plan view of the layup of the resin film 2 in a method of manufacturing a wind turbine blade composed of a fibre-reinforced composite material. The layers of fibrous reinforcement material 20 are laid up in a conventional manner in the wind turbine blade mould 22. For example, an elongate length of the fibrous reinforcement material 20 is unrolled from a roll 24 of the fibrous reinforcement material, and laid up in the mould 22 along the length of the mould 22. Then a layer of the resin film 2 is unrolled from the roll 8 and laid up over the fibrous reinforcement material 20.

As shown in FIG. 3, typically the elongate lengths of resin film 2 may be oriented at an acute angle to the length of the mould 22. The resin film 2 may be applied by a roll dispenser mounted on a gantry above the mould 22, and optionally the positioning of the resin film 2 may be controlled automatically, for example by a robot. As shown in FIG. 3, successive adjacent layers of the resin film 2 are laid up over the fibrous reinforcement material 20 so as substantially to cover the fibrous reinforcement material 20. Then, successive layers of fibrous reinforcement material 20 and resin film 2 are laid up into the mould 22 to form the laminated stack as described above.

A similar production process may be used for other parts and structures to be moulded, in particular large parts such as marine vessels and structural parts therefor. When a boat hull is to be manufactured, the intrinsic tack of the resin film may assist in adhering the resin film to non-horizontal, even vertical, surfaces, of the fibrous reinforcement material or the mould, during the lay-up process.

It may readily be seen from FIGS. 1, 2 and 3 that the use of a resin film in solid form provides a simplified manufacturing process as compared to liquid infusion, for example in a VARTM process. The resin film and fibrous reinforcement material are laid up as solid layers in the mould, and then the mould may be closed. The mould is then heated to wet-out the fibres and cure the resin to form the resultant fibre-reinforced composite material. There is no need for a separate system for infusing liquid resin into the closed mould. Since the resin is laid up as a solid layer, the weight per unit area and the positioning of the resin can be accurately controlled, to achieve a high product uniformity and high mechanical properties, similar to what can be achieved by the use of prepregs. In addition, the provision of a separate resin film and a separate fibrous reinforcement material as starting materials achieves cost savings as compared to the use of prepregs. Also, the supply and storage of a resin film, as compared to a prepreg, achieves greater flexibility in storage and supply.

In accordance with the preferred embodiments of the present invention, the resin film 2 comprises a layer of polymerisable resin which is in the form of a solid layer at 20° C.

As used herein, the term "solid" refers to a conventional solid state material as distinguished from a liquid or gas and intends to include those materials known as semi-solids, or flowable solids. The term semi-solid or flowable-solid is used herein to denote the mechano-physical state of a material that is flowable under moderate stress. More specifically, the semi-solid material should have a complex viscosity between about 10,000 and 3,000,000 cps, especially between about 50,000 and 500,000 cps, measured using a rheometer at a strain of 0.125% and 1 Hz oscillation with a 25 mm parallel plate geometry and 1 mm gap.

At least 50 wt % of the polymerisable resin comprises at least one polymerisable vinyl ester prepolymer having at least two carbon-carbon unsaturated functional groups. The prepolymer is polymerisable by reaction of the unsaturated functional groups to form a cured resin.

In the preferred embodiments of the present invention, the at least one polymerisable vinyl ester prepolymer comprises at least one prepolymer which is present in a concentration of at least 10 wt %, based on the weight of the polymerisable resin, and has the structure $R1_n$-R2-$R1'_m$, wherein R1 and R1' are the same or different, n and m are each at least one and may be the same or different, and each of R1 and R1' includes a carbon-carbon unsaturation at a free end thereof remote from R2, and includes a residue of an epoxy resin. R2 is a polyfunctional chain extending linker between R1 and R1'. R2 is derived from a polyfunctional carboxylic acid having the structure R-$Fn_x$, where Fn is a carboxylic acid functional group, x is at least 2, and R comprises an organic moiety having aliphatic, araliphatic, cycloaliphatic, heterocyclic and/or aromatic groups, containing any type and/or combination of saturated, unsaturated and/or aromatic carbon bonds, and wherein R may be unsubstituted or substituted by functional groups and/or heteroatoms.

Preferably, R2 is derived from a polyfunctional carboxylic acid selected from the group consisting of malic acid, tartaric acid, phenylsuccinic acid, 2-aminooctanedioic acid, phthalic acid, adipic acid, dodecanedioic acid, citric acid, trimesic acid, aconitic acid and mellitic acid.

More preferably, R2 is derived from a di-carboxylic acid selected from the group consisting of malic acid, tartaric acid, phenylsuccinic acid, 2-aminooctanedioic acid, phthalic acid, adipic acid and dodecanedioic acid. In a particularly preferred embodiment, R2 is derived from phthalic acid.

In the preferred embodiments of the present invention, R2 is a di-carboxylic acid containing no additional heteroatoms having a carbon backbone comprising less than <30 carbon atoms. Typically, the carbon backbone comprises ≥10 carbon atoms and comprises unsaturated and/or aromatic carbon bonds in the carbon backbone.

In the preferred embodiments of the present invention, in R1 and R1' the residue is preferably of a bisphenol epoxy resin, and more preferably comprises a residue of a bisphenol A epoxy resin.

Preferably, each of R1 and R1' comprises the structure A-B—, where A includes the carbon-carbon unsaturation in a moiety derived from an acrylate or methacrylate group, and B is a moiety derived from a bisphenol epoxy resin, and in R1 each A and/or B may be the same as or different from the A and/or B in R1'.

In some preferred embodiments, A comprises the residue of a reaction product between a first reactant comprising an acrylate or methacrylate group and a second reactant comprising a dianhydride having an aliphatic, araliphatic, cycloaliphatic, heterocyclic or aromatic moiety.

As described above, at least 50 wt % of the polymerisable resin comprises at least one polymerisable vinyl ester prepolymer having at least two carbon-carbon unsaturated functional groups, the prepolymer being polymerisable by reaction of the unsaturated functional groups to form a cured resin. Furthermore, the at least one polymerisable vinyl ester prepolymer comprises at least one prepolymer which is present in a concentration of at least 10 wt %, based on the weight of the polymerisable resin which has the structure $R1_n$-R2-$R1'_m$. In other words, at least a proportion of the polymerisable resin comprises one or more polymerisable vinyl ester prepolymers which (i) have at least two carbon-carbon unsaturated functional groups but (ii) do not have has the structure $R1_n$-R2-$R1'_m$. These additional polymerisable vinyl ester prepolymer(s) can be co-polymerized with the at least one prepolymer which has the structure $R1_n$-R2-$R1'_m$, and may have a molecule structure between the unsaturated functional groups which may be selected from a variety of alternative structures.

In particular, in some preferred embodiments of the present invention, the polymerisable resin comprises a mixture of at least one first polymerisable vinyl ester prepolymer having the structure $R1_n$-R2-$R1'_m$ and at least one second polymerisable vinyl ester prepolymer having the structure A-B-A, where A includes the carbon-carbon unsaturation in a moiety derived from an acrylate or methacrylate group, and B is a moiety derived from an epoxy resin, typically a bisphenol epoxy resin. Typically, A comprises the residue of a reaction product between a first reactant comprising an acrylate or methacrylate group and a second reactant comprising a dianhydride having an aliphatic, araliphatic, cycloaliphatic, heterocyclic or aromatic moiety, he first and second polymerisable vinyl ester prepolymers.

In other words, in a preferred embodiment the second polymerisable vinyl ester prepolymer has a molecular structure similar to that of the first polymerisable vinyl ester prepolymer, except that the second polymerisable vinyl ester prepolymer does not include a polyfunctional chain extending linker R2, and only includes a single residue or moiety derived from an epoxy resin, typically a bisphenol epoxy resin. In the cured resin of the preferred embodiment, the polymer molecular network comprises the first and second polymerisable vinyl esters cured together, and a proportion of the cured vinyl esters include the polyfunctional chain extending linker R2 to provide the desired rheological properties to the resin film. The at least one first polymerisable vinyl ester prepolymer and the at least one second polymerisable vinyl ester prepolymer are present in a molecular ratio of Z:1, preferably wherein Z is up to 0.5, more preferably wherein Z is within the range of from 0.1 to 0.5.

In the preferred embodiments of the present invention, the polymerisable vinyl ester prepolymer has a heat of polymerization of from 110 to 150 kJ/kg, preferably from 120 to 140 kJ/kg, more preferably from 125 to 135 kJ/kg, typically about 130 kJ/kg.

Preferably, the polymerisable vinyl ester prepolymer has a theoretical average, by number, molecular weight of from 750 to 1250, for example from 800 to 1100.

Preferably, the polymerisable vinyl ester prepolymer has less than 2.2 gram equivalents of unsaturation per kilogram of the polymerisable vinyl ester prepolymer.

The polymerisable resin further comprises a curing system, which is preferably a free-radical curing system for polymerizing the polymerisable vinyl ester prepolymer. In the preferred embodiments of the present invention, the free-radical curing system comprises at least one peroxide curing agent having a self-accelerating decomposition temperature (SADT) within the range of from 45 to 95° C. More preferably, the self-accelerating decomposition temperature is within the range of from 50 to 80° C., for example from 55 to 70° C.

Preferably, the at least one peroxide curing agent is present in a concentration of from 0.1 to 3 parts per hundred based on the weight of the polymerisable vinyl ester prepolymer. Preferably, the at least one peroxide curing agent is present in a concentration of from 0.5 to 5 parts per hundred, for example from 0.5 to 1.5 parts per hundred, based on the weight of the polymerisable vinyl ester prepolymer.

In the preferred embodiments of the present invention, the at least one peroxide curing agent is selected from tert-butoxy 2-ethylhexyl carbonate, 2-Butanone peroxide (methyl ethyl ketone peroxide), dibenzoyl peroxide, cyclohexylidenebis[tert-butyl] peroxide, cyclohexylidenebis[tert-amyl] peroxide, cumene hydroperoxide, tert-butylperoxy isopropyl carbonate, tert-butyl peroxybenzoate, tert-butyl peroxy-3,5,5-trimethylhexanoate, 1,1-di(tert-butylperoxy)-3,3,5-trimethylcyclohexane, tert-amyl peroxy-2-ethylhexyl carbonate, di-tert-butyl peroxide, tert-amyl peroxybenzoate, di-tert-amyl peroxide, N-Butyl-4,4-di(tert-butylperoxy) valerate, 1,2-dimethylproplyidene dihydroperoxide and methyl isopropyl ketone peroxide or any mixture of two or more thereof.

Examples of peroxide curing agents that may be used in accordance with the present invention are listed in Table 1.

TABLE 1

| Peroxide | CAS No. | Trade Names | SADT (° C.) |
|---|---|---|---|
| Tert-butoxy 2-ethylhexyl carbonate | 34443-12-4 | Luperox TBEC, Trigonox 117 | 60-65 |
| 2-Butanone peroxide (MEKP) | 94-36-0 | Butanox M50 | 60 |
| Dibenzoyl peroxide | 94-36-0 | Luperox A98, Perkadox L-W40 | 60-70 |
| Cyclohexylidenebis[tert-butyl] peroxide | 3006-86-8 | Trigonox 22-C50, Luperox 331M80 | 70 |
| Cyclohexylidenebis[tert-amyl] peroxide | 15667-10-4 | Luperox 531M80 | 60-65 |
| Cumene hydroperoxide | 80-15-9 | Luperox CU90, Trigonox K-90 | 55-82 |
| Tert-Butylperoxy isopropyl carbonate | 2372-21-6 | Trigonox BPIC-C75, Luperox TBIC M75 | 65-70 |

TABLE 1-continued

| Peroxide | CAS No. | Trade Names | SADT (° C.) |
|---|---|---|---|
| Tert-Butyl peroxybenzoate | 614-45-9 | Trigonox C, Luperox P | 60 |
| Tert-Butyl peroxy-3,5,5-trimethylhexanoate | 13122-18-4 | Trigonox 42S | 55 |
| 1,1-Di(tert-butylperoxy)-3,3,5-trimethylcyclohexane | 6731-36-8 | Trigonox 29-C50, Luperox 231 | 60-66 |
| Tert-amyl peroxy-2-ethylhexyl carbonate | 70833-40-8 | Trigonox 131, Luperox TAEC | 65 |
| Di-tert-butyl peroxide | 110-05-4 | Luperox DI | 80 |
| Tert-amyl peroxybenzoate | 4511-39-1 | Trigonox 127, Luperox TAP | 65 |
| Di-tert-amyl peroxide | 10508-09-5 | Luperox DTA | 75 |
| N-Butyl-4,4-di(tert-butylperoxy)valerate | 995-33-5 | Trigonox 17, Luperox 230 | 75 |

Trigonox, Luperox, Butanox and Perkadox are Registered Trade Marks

In the preferred embodiments of the present invention, the free-radical curing system further comprises (i) a first auxiliary curing agent comprising a transition metal complex or a transition metal ligand and/or (ii) a second auxiliary curing agent comprising at least one of an aliphatic dione and a nitrogen-containing aliphatic or aromatic compound.

Typically, in the first auxiliary curing agent the transition metal comprises copper or iron.

One preferred first auxiliary curing agent is a copper complex comprising copper acetate and potassium neodecanoate, to provide copper ions with a neodecanoate ligand, in a solvent mixture. The solvent mixture may comprise diethylene glycol and diethanolamine. A suitable copper complex is sold under, the trade mark Nouryact® CF12N (CAS Number 142-71-2) by Nouryon.

Another preferred first auxiliary curing agent is an iron complex comprising 2,2'-bipyridine as a ligand for iron ions in a solvent mixture. The solvent mixture may comprise diethylene glycol and diethanolamine. Suitable iron complexes are sold under the trade marks Nouryact® CF30 and Nouryact® CF40, and BORCHI® OXY-CURE, by Nouryon.

A further preferred first auxiliary curing agent is an iron complex comprising iron (1+), chloro[dimethyl-9,9-dihydroxy-3-methyl-2,4-di-(2-pyridylkN)-7-[(2-pyridinyl-kN) methyl]-3,7-diazabicyclo[3.3.1]nonane-1,5-dicarboxylate-$kN^3$,$kN^7$]-, chloride(1-). The iron complex may again be in a solvent, for example 2-hydroxy methacrylate. A suitable iron complex is sold under the trade name FeONIX C1-95 by Welychem Catexel and has CAS Number 478945-46-9. Another suitable iron complex is sold under the trade mark Nouryact® CF40 by Nouryon.

Preferably, the first auxiliary curing agent is present in a concentration of from 0.05 to 3.0 parts per hundred based on the weight of the polymerisable vinyl ester prepolymer, more preferably from 0.2 to 1 parts per hundred, for example from 0.2 to 0.6 parts per hundred.

Typically, the nitrogen-containing aliphatic or aromatic compound comprises a substituted or unsubstituted acetamide, aniline or toludine.

Preferably, the aliphatic dione comprises 2,4-pentane dione, ethyl acetoacetate, N,N-diethylacetoacetamide, 3-methyl-2,4-pentanedione, or 3-ethyl-2,4-pentanedione, or any mixture of any two or more thereof, and/or the nitrogen-containing aliphatic or aromatic compound comprises N,N-diethylacetoacetamide, 4,N,N-trimethyl aniline, N,N-diethylaniline or ethoxylated-para-toluidine, or any mixture of any two or more thereof.

Preferably, the second auxiliary curing agent is present in a concentration of from 0.05 to 3.0 parts per hundred based on the weight of the polymerisable vinyl ester prepolymer, more preferably from 0.1 to 3 parts per hundred, yet more preferably from 0.2 to 1 parts per hundred, for example from 0.2 to 0.6 parts per hundred.

In the preferred embodiments of the present invention, the free-radical curing system further comprises a curing inhibitor comprising a substituted benzene, optionally 10H-Phenothiazine.

Preferably, the curing inhibitor is present in a concentration of from 0.01 to 1.0 parts per hundred based on the weight of the polymerisable vinyl ester prepolymer, for example from 0.01 to 0.1 parts per hundred.

In the preferred embodiments of the present invention, the polymerisable resin has viscoelastic properties which enables the resin film 2 to be deposited as a solid layer onto a fibrous layer in a mould, and then upon heating readily and uniformly wet-out the fibrous layer prior to curing of the polymerisable resin.

For example, preferably the polymerisable resin in the resin film, the polymerisable resin additionally comprising the curing system, has a cold Tg of from −10 to 15° C., preferably from −5 to 5° C., measured using a dynamic oscillatory measurement within a temperature range of −10 to 40° C. at a ramp rate of 2° C./minute.

The preferred polymerisable resin has a phase angle (δ) Tonset delta between a storage modulus and a loss modulus of the polymerisable resin of −5 to 15° C., measured using a dynamic oscillatory measurement within a temperature range of −10 to 40° C. at a ramp rate of 2° C./minute. Preferably, the polymerisable resin has a storage modulus and a loss modulus which are equal within a temperature range of from 70 to 110° C., measured using a dynamic oscillatory measurement within a temperature range of 30 to 130° C. at a strain of 0.125% and ramp rate of 1° C.

Preferably, the polymerisable resin has a minimum viscosity within a temperature range of from 75 to 100° C., measured using a dynamic oscillatory measurement within a temperature range of 30 to 130° C. at a strain of 0.125% and ramp rate of 1° C.

Preferably, the at least one polymerisable vinyl ester prepolymer of the polymerisable resin, in the absence of any curing system for polymerizing the polymerisable vinyl ester prepolymer, has a viscosity within the range of 30 to 100 Poise, typically from 50-80 Poise, at a temperature of 85° C., measured using a CAP viscometer from AMETEK Brookfield at a shear rate of 0.5-12 $s^{-1}$, which may be achieved using spindle 3 at a rotational velocity of 50 rpm for a run time of 20 seconds.

In the preferred embodiments of the present invention, the polymerisable resin is free of any particulate filler and/or free of any solvent for the at least one polymerisable vinyl ester prepolymer. Additionally or alternatively, in the preferred embodiments of the present invention, the polymerisable resin consists of the at least one polymerisable vinyl ester prepolymer and a free-radical curing system for polymerizing the polymerisable vinyl ester prepolymer.

The resin films of the preferred embodiments of the present invention have particular application to wind turbine blade construction and the fabrication of production boats. Although different performance, curing and handling characteristics are required for each different application, nevertheless the use of the resin film, to avoid the higher cost of prepregs and to avoid the processing difficulties of liquid resin infusion, apply to each application.

In accordance with the preferred embodiments of the present invention, the resin film is a self-curing 1K thermoset resin film. This can be supplied in solid form, for example in a roll, directly to the component fabricator.

The primary benefits of the use of a resin film in accordance with the preferred embodiments of the present invention include:

Reduced material costs—reinforcing fabrics may be procured directly by the end user lowering logistics costs and prepreg conversion costs.

Depending on the resin chemistry other advantages may be realised including:

- a. Fast/snap curing for lower production cycle times, which can provide operational expenditure (OPEX) and/or capital expenditure (CAPEX) savings.
- b. Reduced/eliminated transportation and storage costs as cold/frozen storage can be reduced or eliminated.
- c. Prepreg performance, i.e. high performance, for infusion cost, i.e. low cost
- d. Simplified infusion set-up mas compared to VARTM
- e. Low resin absorption in core materials
- f. Eliminate core finishing costs
- g. Controlled blade weight
- h. Faster application and lower skill process
- i. Reduced consumable waste
- j. Option to supply as part of a kit.

Preferably, the 1K resin films may be manufactured in a variety of different film weights for a fabricator to combine with a fabric and produce a laminate.

The resin film is also preferably formulated to have sufficient structure to prevent the resin inadvertently flowing during storage and transportation under the forces exerted when supplied in large rolls. Preferably, the resin molecular weight is increased or advanced to limit "cold flow".

In accordance with the preferred embodiments of the present invention, the resin film comprises a styrene-free methacrylate resin cured with an accelerated peroxide curing agent provided short processing times and low material costs.

In addition, in accordance with the preferred embodiments of the present invention, the resin film exhibits increased cold flow resistance to provide dimensional stability when supplied as a roll of unreinforced resin. This may be achieved through acid modification during the base resin synthesis, which acts to increase the molecular weight, and therefore lower the tack and increase the cold flow resistance.

In accordance with the preferred embodiments of the present invention, the resin film exhibits reliable process stability, shelf life and curing by the use of the combination of a peroxide curing agent and accelerator(s) which are selected and used in concentrations to increase shelf life, even at high storage temperatures, yet provide rapid and low temperature curing, for example a curing time of from 1 to 2 hours at a curing temperature of 80° C.

In accordance with the preferred embodiments of the present invention, during use of the resin film, unlike the use of a prepreg system, the fibrous reinforcement is not pre-wet with matrix resin. In addition, the use of a radical curing agent for curing the polymerisable resin can ensure that the viscosity does not increase straight away when curing, providing a period of time for wet-out and "fibre washing" prior to viscosity increase and matrix gelation.

In accordance with the preferred embodiments of the present invention, the combination of the polymerisable resin and the radical curing agent for curing the polymerisable resin may be formulated to provide a medium temperature curing (e.g. about 100° C.) system to provide long ambient shelf life to eliminate the requirement for cold shipment and storage, which is typically required for prepregs. Alternatively, the combination of the polymerisable resin and the radical curing agent for curing the polymerisable resin may be formulated to provide a low temperature (e.g. about 70° C.) curing system to suit low temperature curing at the expense of ambient storage life.

Typically, the resin film in accordance with the preferred embodiments of the present invention exhibits one or more of the following properties:

The resin film is self-adhesive (i.e. has some tack) and is flexible, and has sufficient tear strength and tensile strength to be formed in a range of different film weights, for example from 20 to 1000 $g/m^2$, and can be stored in a rolled format without distorting or tearing. The tack is sufficient to enable in-mould positioning of the resin film at the desired location.

The resin film has sufficient "shelf life" to remain stable for several months without the requirement to store in refrigerated environments. The storage does not distort or flow on the roll during storage, and can be stored in ambient conditions without gelation occurring.

The resin film can be laminated with glass, carbon or other fibre reinforcements to fabricate a composite laminate.

The resin can be subjected to an elevated temperature, for example greater than 60° C., during the filming step of the preparation of the resin film and the resin does not cure, or gel adversely during preparation of the film. Typically, the resin has a gel time of from 10 to 60 minutes, preferably from 25 to 45 minutes, at a temperature of 70° C., as measured with a 100 gram sample using the Tecam method. The chemistry used in the polymerisable prepolymer and curative system is solvent-free and volatile-free and free, or substantially free, of highly toxic chemicals such as CMRs (chemicals which are carcinogenic, mutagenic or toxic to reproduction) and SVHCs (chemicals which are designated substances of very high concern).

Upon exposure to heat and pressure, the resin lowers in viscosity to impregnate and wet-out the fibre reinforcement forming a composite structure. The reactivity of the resin system is such that it provides enough time and a sufficient low enough viscosity to allow this to happen without curing.

Once the reinforcement has been wet, the resin rapidly crosslinks to form a cured thermoset composite of sufficient thermal and mechanical properties for the intended applications including wind turbine blade and marine craft. Preferably, the resin has a reaction onset temperature within the range of from 70 to 125° C., more preferably from 80 to 100° C., as measured by dynamic scanning calorimetry (DSC) over a temperature range of from 25 to 260° C. at a ramp rate of 10° C./minute. The resin preferably has an enthalpy of from 100 to 200 Joules/gram, more preferably from 115 to 150 Joules/gram; as measured by dynamic scanning calorimetry (DSC) over a temperature range of from 25 to 260° C. at a ramp rate of 10° C./minute. The resin preferably exhibits a peak temperature upon curing within the range of from 90 to 130° C., more preferably from 110 to 120° C., as measured by dynamic scanning calorimetry (DSC) over a temperature range of from 25 to 260° C. at a ramp rate of 10° C./minute, under a nitrogen environment.

The speed of curing is sufficiently rapid to allow a reduction in manufacturing "cycle time" remaining economical (typically <2 hours depending on cure temperature, which is preferably below 100° C.).

The temperature of curing is sufficiently low, preferably below 100° C., for example a curing temperature of 80° C., to facilitate the use of low temperature tooling which is associated with lower tooling manufacturing and material costs, reduce energy consumption during cure and lower curing cycle times.

The present invention is further described with reference to the following non-limiting Examples.

Comparative Example 1

The Applicant's earlier WO-A-2011/073111 discloses vinyl ester resins which are synthesised using a two-step process. In a first step 2-hydroxyethylmethacrylate (Hema) is reacted with phthalic anhydride to form Hema phthalate as shown by the reaction below:

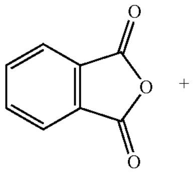

Phthalic anhydride

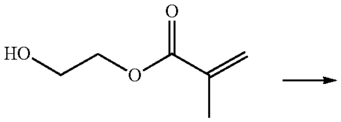

Hydroxyethylmethacrylate (HEMA)

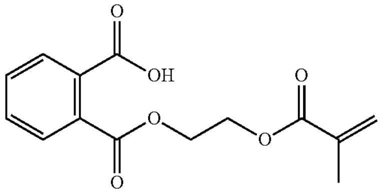

Hema phthalate

Thereafter, in a second step the Hema phthalate is reacted with liquid bisphenol A epoxy resin as shown by the reaction below to produce a vinyl ester called herein "vinyl ester 1":

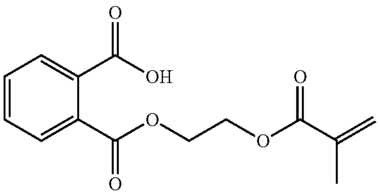

Hema phthalate

+

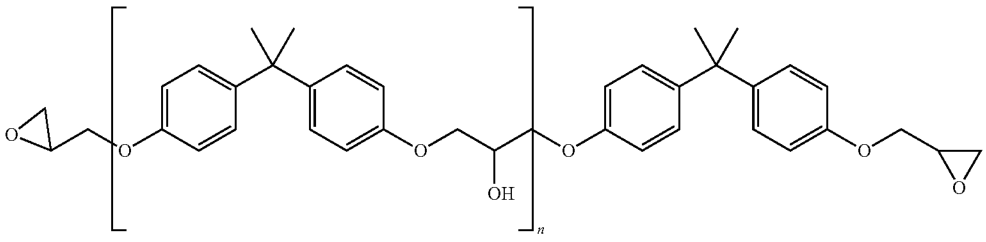

Liquid bisphenol A epoxy resin

-continued

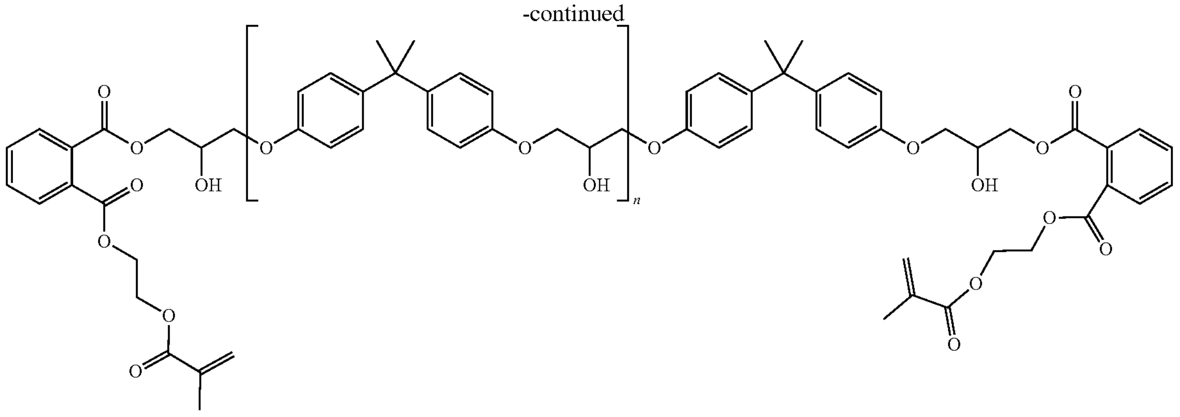

Vinyl ester 1

Figure 4:
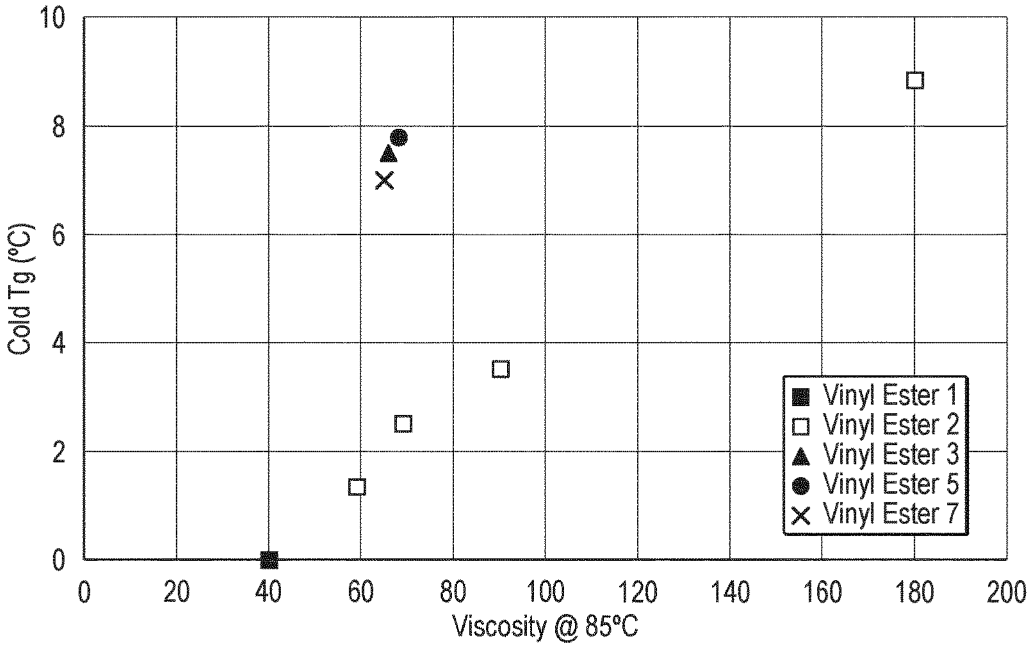
FIG. 4 is a graph showing the relationship between cold Tg and viscosity for an Example of the present invention and for Comparative Examples.

FIG. 4 is a graph which shows the relationship between cold Tg and viscosity at 85° C. for a variety of different resins, including vinyl ester 1. In FIG. 4, the cold Tg was measured by DSC for the resin alone, i.e. without addition of the curing system, the viscosity was also measured for the resin alone, using a Brookfield cone and plate viscometer. The curing system comprises one or more peroxide and auxiliary curing agents, which are typically low viscosity fluids. Therefore, the resin viscosity is lowered when the curing system is added to the resin and the cold Tg value of the resin is also lowered when the curing system is added to the resin.

When synthesised with stoichiometric quantities of reagents, this vinyl ester 1 was found to have a viscosity of 30-50 Poise at 85° C. (viscosity was measured for the resin alone) and a cold Tg, measured by DSC (for the resin alone without addition of the curing system), of from −5 to 0° C.

FIG. 4 shows that the resin cold Tg is too low and the viscosity when mixed with low viscosity peroxide curatives is too low for use a polymerisable resin film.

Vinyl ester 1, comprising a polymerisable vinyl ester prepolymer, was found to be unsuitable or formation as a resin film because the tack of the resin was too high and the flow-on-the-roll of the resin was too high.

It is believed by the present inventors that the excessively high tack and flow-on-the-roll properties, which prevent vinyl ester 1 from serving as a resin film in accordance with the present invention, is associated with the property of a low temperature value for the cold Tg of the vinyl ester resin. In other words, the present inventors believed that an increase on the value of the cold Tg is required in order to improve the tack and flow-on-the-roll properties.

However, increasing the cold Tg typically also increases resin viscosity, and if the resin viscosity is too high this would inhibit good fabric wet-out when making laminates.

The present inventors investigated various mechanisms to try to improve the properties of vinyl ester 1 by increasing the cold Tg value with the aim of providing a resin suitable for making a resin film having the desired properties.

Comparative Example 2

In Comparative Example 2, vinyl ester 1 was subjected to an additional B-staging step by reacting vinyl ester 1 with a diisocyanate to make a modified polymerisable vinyl ester prepolymer, called herein "vinyl ester 2".

The reaction scheme is below:

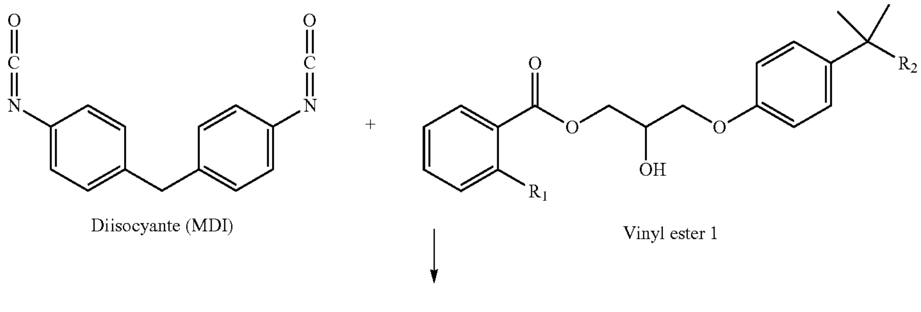

Diisocyante (MDI)

Vinyl ester 1

-continued

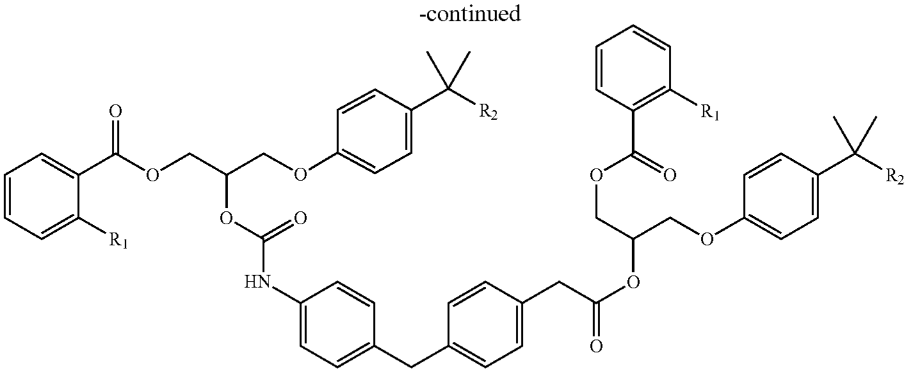

Vinyl ester 2

In this reaction scheme, the isocyanate functionalities of the diisocyanate link the vinyl ester 1 molecules at available hydroxyl groups by forming urethane groups. The molecule of vinyl ester 2 is chain-extended as compared to the molecule of vinyl ester 1.

However, it was found that although for vinyl ester 2 the value of the cold Tg (measured for the resin alone) was increased; nevertheless the resin viscosity at 85° C. (measured for the resin alone) also increased linearly with temperature, as shown in FIG. 4.

Vinyl ester 2 was found to be unsuitable for use as a resin film, since the tack and flow-on-the-roll were still too high, or the viscosity was too high.

Comparative Example 3

In Comparative Example 3, an alternative vinyl ester, called herein "vinyl ester 3" as compared to Comparative Example 1 was synthesised. As compared to Comparative Example 1, 15 wt % of the liquid bisphenol A epoxy resin was replaced with a solid epoxy resin, which is an advanced, higher molecular weight epoxy resin having an epoxy equivalent weight (EEW) of 325, n=1.3 and a viscosity of 60 Poise at 85° C., the solid epoxy resin being available from Nan Ya Electronic Materials Kunshan Corp. Ltd., China under the product code NPES-901.

As shown in FIG. 4, the resultant modified polymerisable vinyl ester prepolymer, vinyl ester 3, had desirable rheological properties, in particular an increased cold Tg (measured for the resin alone) and acceptable resin viscosity at 85° C. (measured for the resin alone), nevertheless the resin was not suitable for use to form a resin film since the polymerisable vinyl ester prepolymer was prone to gelation, and was found to be stable for only 6 days at 85° C., therefore limiting downstream filming and manufacture processes.

Comparative Example 4

In Comparative Example 4, an alternative vinyl ester, called herein "vinyl ester 4" as compared to Comparative Example 1 was synthesised. As compared to Comparative Example 1, 15 wt % of the liquid bisphenol A epoxy resin was replaced with a solid novolac epoxy resin having an epoxy equivalent weight (EEW) of 224 and a viscosity of 90 Poise at 85° C.

Vinyl ester 4 was synthesised according to the following reaction scheme shown below:

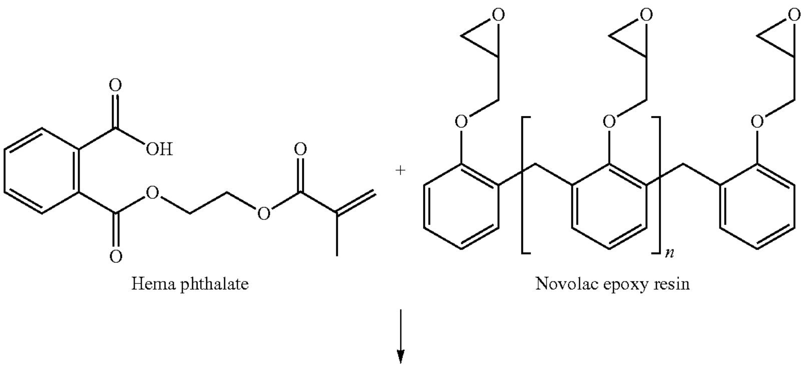

Hema phthalate

Novolac epoxy resin

-continued

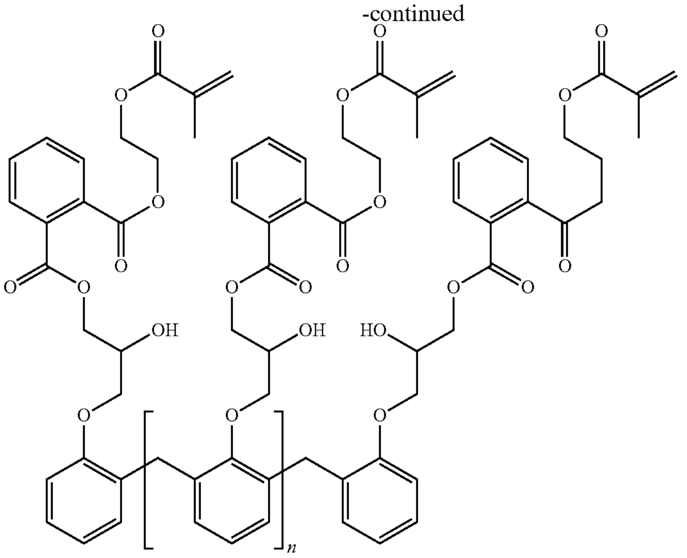

Vinyl ester 4

The resultant mixture of vinyl ester 1 with vinyl ester 4 provided a mixed polymerisable resin prepolymer system, called herein "vinyl ester 5". The cold Tg (measured for the resin alone) and resin viscosity at 85° C. (measured for the resin alone) of vinyl ester 5 were acceptable, as shown in FIG. 4. However, the polymerisable vinyl ester prepolymer mixture was prone to gelation, and was found to be stable for only 3 days at 85° C. Consequently, the resin was not suitable for use to form a resin film In Comparative Example 4, vinyl ester 1 was subjected to an additional B-staging step by reacting vinyl ester 1 with a diisocyanate to make a modified polymerisable vinyl ester prepolymer, called herein "vinyl ester 2".

Comparative Example 5

In Comparative Example 5, an alternative vinyl ester, called herein "vinyl ester 6" as compared to Comparative Example 1 was synthesised. As compared to Comparative Example 1, in the second step of the synthesis of vinyl ester 1, in which Hema phthalate is reacted with the liquid bisphenol A epoxy resin, a portion of the Hema phthalate was replaced by phthalic anhydride, which is di-functional, can react with the epoxide groups, and functions as an in-situ chain extender during the second step of the synthesis.

Vinyl ester 6 was synthesised according to the following reaction scheme shown below:

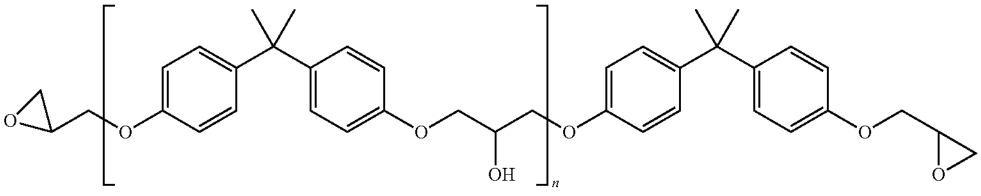

Liquid bisphenol A epoxy resin

+

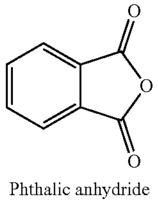

Phthalic anhydride

-continued

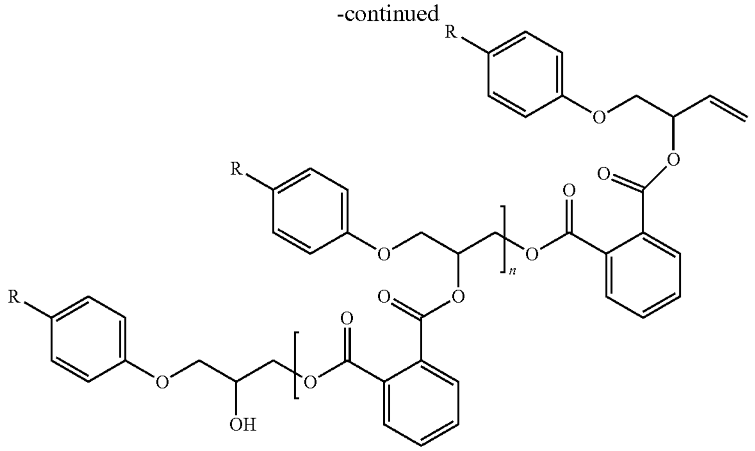

In situ chain extended link in vinyl ester 6

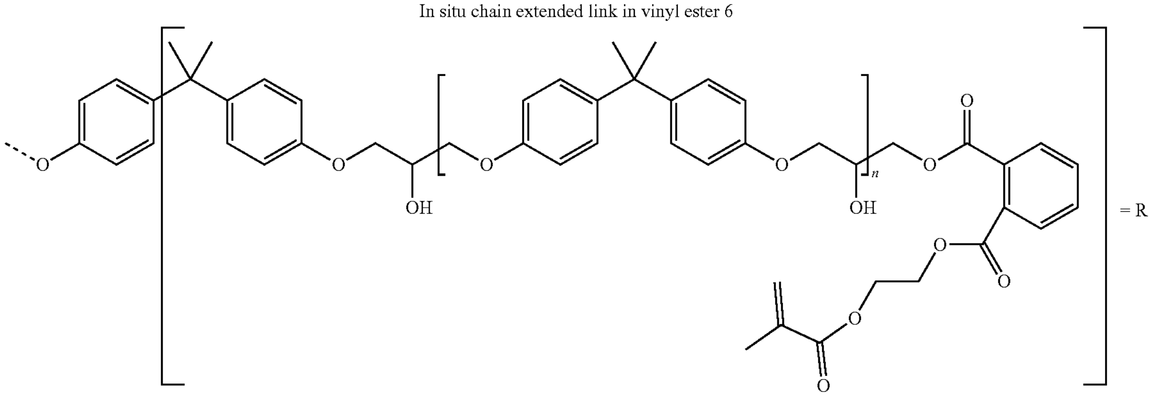

The resultant vinyl ester 6 provided a polymerisable resin prepolymer for which the cold Tg (measured for the resin alone) and resin viscosity at 85° C. (measured for the resin alone) were acceptable, as shown in FIG. 4. However, the polymerisable vinyl ester prepolymer was prone to gelation during the reaction to form vinyl ester 6. Consequently, the resin was not suitable for use to form a resin film Example 1

In accordance with at least one aspect of the present invention, the molecular weight of a vinyl ester polymerisable prepolymer is increased by chain extending the monomer in situ using a specific polyfunctional chain extending linker.

In particular, it has been unexpectedly found by the present inventors that a polyfunctional chain extending linker which is derived from a polyfunctional carboxylic acid, having at least two functional groups capable of reacting with the epoxide groups, can provide a polymerisable resin prepolymer which is suitable for use to form a resin film. The use of such a polyfunctional chain extending linker has been found to provide unexpectedly high stability in a high viscosity resin, and in particular has been found to a sufficiently high viscosity and controllable tack so that a resin film can be formed, which can be formed as a roll, and the resin can achieve a stable viscosity value with minimal gelation when the polymerisable resin prepolymer is stored prior to be cured in the manufacture of a fibre-reinforced resin matrix composite material, In this Example, the 2-Hydroxyethyl methacrylate was reacted with phthalic anhydride to form 2-hydroxyethyl methacrylate phthalate, otherwise called herein "Hema phthalate". The reaction scheme is shown below:

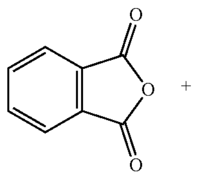

Phthalic anhydride

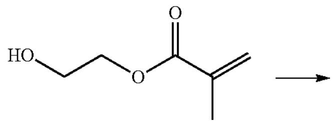

Hydroxyethylmethacrylate (HEMA)

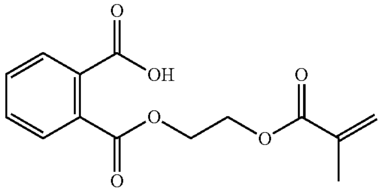

Hema phthalate

Then the Hema phthalate and phthalic acid were reacted with liquid bisphenol-A epoxy resin to form a vinyl ester monomer, called herein "vinyl ester 7". The general reaction scheme is shown below:
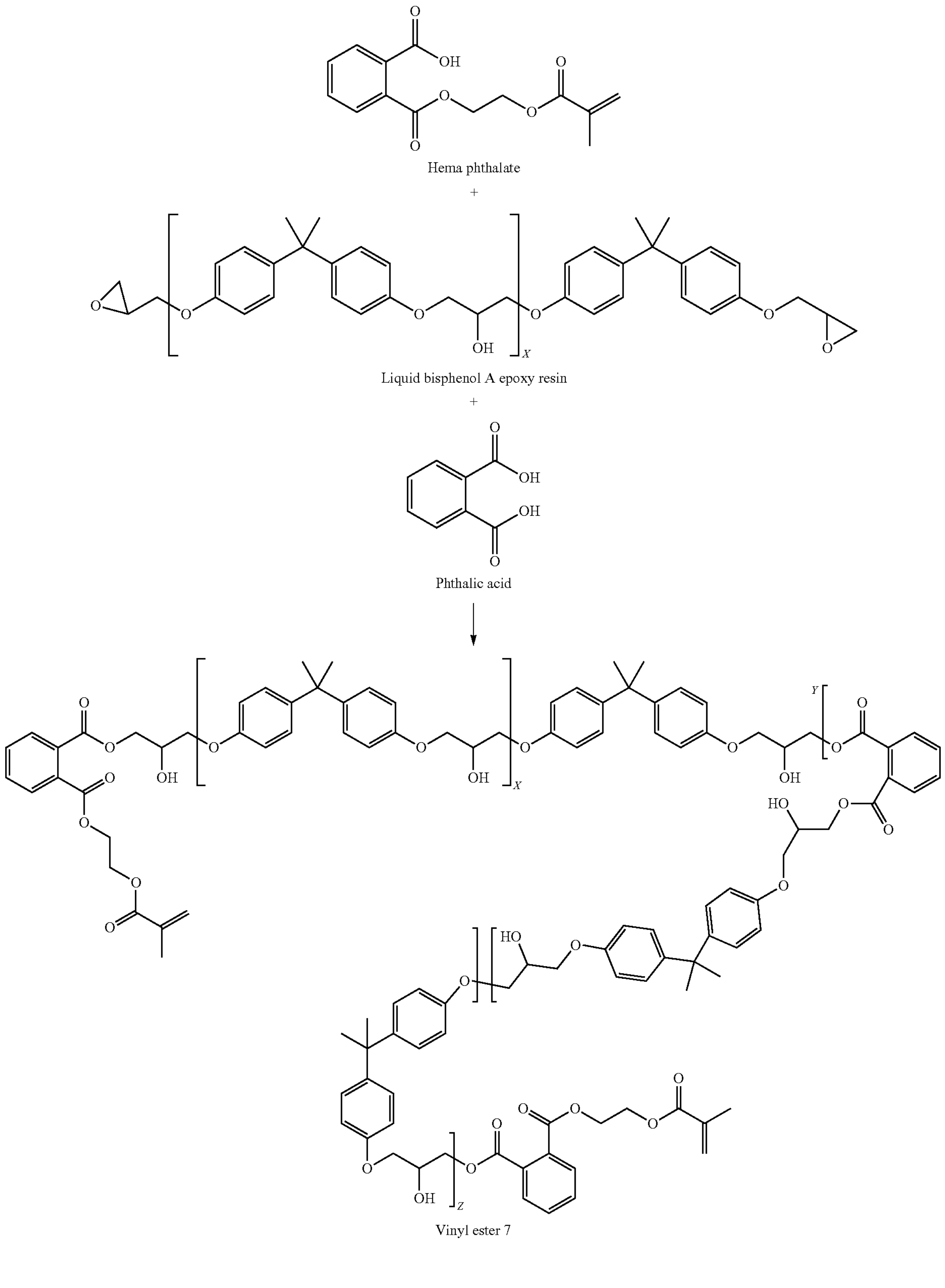
Vinyl ester 7

Hema phthalate was synthesized using the reaction scheme disclosed in Example 1 of WO-A-2011/073111. In order to synthesise the Hema phthalate, 2-hydroxyethyl methacrylate was added to a reactor having a top cover and which was sparged with a flow of air passing through the reactor. The 2-hydroxyethyl methacrylate was agitated and heated to at least 80° C. A catalytic amount of Triphenylphosphine (TPP) was added followed by a stoichiometric amount of phthalic anhydride. Following dissolution of all the phthalic anhydride, the reaction was allowed to continue until the viscosity levelled-off. The reaction period was between 4-10 hours. Phenothiazine (PTZ) was then added as an inhibitor, and was allowed to dissolve.

In order to synthesise the vinyl ester 7, the Hema phthalate was agitated and air sparged at all times throughout the subsequent synthesis. To the Hema phthalate, at a temperature of at least 80° C., a second amount of triphenylphosphine (TPP) was added followed by a liquid epoxy resin DER 330, and phthalic acid. The reaction was maintained at a temperature of at least 100° C. until the viscosity levelled-off. It was ensured that the viscosity had stabilised; determined as any change in viscosity over a 1 hour period being <5 Poise (as measured at 85° C. using a cone and plate method), before dispensing the vinyl ester prepolymer.

In order to form the curable resin film, the vinyl ester prepolymer was then mixed with the free-radical curing system. In this example, the free-radical curing comprised, for 100 parts by weight of the synthesised vinyl ester, 1.0 part by weight of tert-butyl peroxybenzoate (known under the brand name Luperox P) as a first peroxide curing agent, 0.6 parts by weight of part by weight of Nouryact CF12 as a first auxiliary curing agent and 0.4 parts by weight of 2,4-pentanedione as a second auxiliary curing agent.

The vinyl ester prepolymer was preheated to a temperature within the range of from 60 to 70° C. and the free-radical curing system was mixed into the vinyl ester prepolymer to achieve a homogeneous product, using a dual asymmetric centrifugal mixer. The auxiliary curing agents were added first and mixed in, and then the peroxide curing agents were added and mixed in.

Directly after mixing the vinyl ester prepolymer and the free-radical curing system, the homogeneous resin was formed into a resin film using a filming step. In the filming step, the resin was deposited onto a polyester scrim fabric having an areal weight of 15 gsm which was over a paper backing sheet. The desired film thickness was achieved using a heated knife over a roller.

The resultant vinyl ester 7 provided a polymerisable resin prepolymer for which the cold Tg (measured for the resin alone) and resin viscosity at 85° C. (measured for the combination of the resin and the curing system) were acceptable, as shown in FIG. 4.

The resultant resin film comprising vinyl ester 7 resin and a curing system had the following properties, using the measurement methods described herein:

Rheology i.e. parameters that define the cure performance of the material, wet-out characteristics, stability on the roll and tack):

Gelation temperature 89.8° C.—defined by storage and loss modulus cross-over point (G'=G"), as measured by Dynamic oscillatory measurement, 0.125% strain, 30-130° C.

Cold Tg 3.9° C.—measured for the combination of the resin and the curing system and defined by storage and loss modulus cross-over point (G'=G"), as measured by dynamic oscillatory measurement, 2° C./min, −10-40° C.

Phase angle (δ) Tonset delta between a storage modulus and a loss modulus of the polymerisable resin 4.6° C.—measured using a dynamic oscillatory measurement within a temperature range of −10 to 40° C. at a ramp rate of 2° C./minute Gel time, i.e. parameter that defines the material's manufacturability and storage stability at ambient temperatures):

56.5 minutes gel time at 70° C.—measured by the Tecam method with a 100 g sample Resin viscosity i.e. parameter that defines stability to flow-on-the-roll, wet-out and tack: Resin viscosity (resin alone, without cure agents) 58 Poise-measured using a CAP viscometer, spindle 3, 50 rpm, 20 seconds run time, 85° C.

Minimum viscosity temperature 84.3° C.—measured using a dynamic oscillatory measurement within a temperature range of 30 to 130° C. at a strain of 0.125% and ramp rate of 1° C.

Reaction temperature and enthalpy, i.e. parameters that define storage stability at room temperature, cure performance and manufacturability:

Reaction Onset Temperature=122° C.

Enthalpy of Reaction 130.1 J/g;

Peak Temperature 128.93° C.—all measured by dynamic scanning calorimetry, 10° C./min, 25-260° C.

The invention claimed is:

1. A resin film comprising a layer of polymerisable resin which is in the form of a solid layer at 20° C., at least 50 wt % of the polymerisable resin comprising at least one polymerisable vinyl ester prepolymer having at least two carbon-carbon unsaturated functional groups, the at least one polymerisable vinyl ester prepolymer being polymerisable by reaction of the at least two carbon-carbon unsaturated functional groups to form a cured resin, wherein the polymerisable resin further comprises a curing system for polymerizing the polymerisable vinyl ester prepolymer, wherein the at least one polymerisable vinyl ester prepolymer comprises at least one prepolymer which is present in a concentration of at least 10 wt %, based on the weight of the polymerisable resin, and has the structure $R1_n$-R2-$R1'_m$, wherein the $R1_n$ and $R1'_m$ are the same or different, n and m are each at least one and are the same or different, and each of the $R1_n$ and the $R1'_m$ includes a carbon-carbon unsaturation at a free end thereof remote from the R2 and includes a residue of an epoxy resin, and wherein the R2 is a polyfunctional chain extending linker between the $R1_n$ and $R1'_m$, and is derived from a polyfunctional carboxylic acid having the structure R-$Fn_x$, where the Fn is a carboxylic acid functional group, x is at least 2, and the R comprises an organic moiety having aliphatic, araliphatic, cycloaliphatic, heterocyclic and/or aromatic groups, containing any type and/or combination of saturated, unsaturated and/or aromatic carbon bonds, and wherein the R is unsubstituted or substituted by functional groups and/or heteroatoms.

2. A resin film according to claim 1 wherein the R2 is derived from a polyfunctional carboxylic acid selected from the group consisting of malic acid, tartaric acid, phenylsuccinic acid, 2-aminooctanedioic acid, phthalic acid, adipic acid, dodecanedioic acid, citric acid, trimesic acid, aconitic acid and mellitic acid.

3. A resin film according to claim 2 wherein the R2 is derived from a di-carboxylic acid selected from the group consisting of malic acid, tartaric acid, phenylsuccinic acid, 2-aminooctanedioic acid, phthalic acid, adipic acid and dodecanedioic acid.

4. A resin film according to claim 1 wherein each of the $R1_n$ and the $R1'_m$ includes a residue of a bisphenol epoxy resin.

5. A resin film according to claim 1 wherein each of the $R1_n$ and the $R1'_m$ comprises the structure A-B—, wherein:

the A includes the carbon-carbon unsaturation in a moiety derived from an acrylate or methacrylate group, the B is a moiety derived from a bisphenol epoxy resin, in the $R1_n$ each A and/or B is the same as or different from the A and/or B in the $R1'_m$, and the A comprises the residue of a reaction product between a first reactant comprising an acrylate or methacrylate group and a second reactant comprising a dianhydride having an aliphatic, araliphatic, cycloaliphatic, heterocyclic or aromatic moiety.

6. A resin film according to claim 1 wherein the polymerisable resin comprises a mixture of:

the at least one first polymerisable vinyl ester prepolymer having the structure $R1_n$-R2-$R1'_m$, and at least one second polymerisable vinyl ester prepolymer having the structure A-B-A, where the A includes carbon-carbon unsaturation in a moiety derived from an acrylate or methacrylate group, and the B is a moiety derived from an epoxy resin, wherein the at least one polymerisable vinyl ester prepolymer and the at least one second polymerisable vinyl ester prepolymer are present in a molecular ratio of Z:1, Z being within the range of from 0.1 to 0.5.

7. A resin film according to claim 1 wherein the at least one polymerizable vinyl ester prepolymer has a heat of polymerization of from 110 to 150 kJ/kg.

8. A resin film according to claim 1 wherein the at least one polymerisable vinyl ester prepolymer has a theoretical average, by number, molecular weight of from 750 to 1250.

9. A resin film according to claim 1 wherein the at least one polymerisable vinyl ester prepolymer has less than 2.2 gram equivalents of unsaturation per kilogram of the polymerisable vinyl ester monomer.

10. A resin film according to claim 1, wherein the polymerisable resin further comprises a free-radical curing system for polymerizing the at least one polymerisable vinyl ester prepolymer, and wherein the free-radical curing system comprises at least one peroxide curing agent having a self-accelerating decomposition temperature within the range of from 45 to 95° C.

11. A resin film according to claim 10 wherein the at least one peroxide curing agent is selected from tert-butoxy 2-ethylhexyl carbonate, 2-butanone peroxide, dibenzoyl peroxide, cyclohexylidenebis[tert-butyl] peroxide, cyclohexylidenebis[tert-amyl] peroxide, cumene hydroperoxide, tert-butylperoxy isopropyl carbonate, tert-butyl peroxybenzoate, tert-butyl peroxy-3,5,5-trimethylhexanoate, 1,1-di(tert-butylperoxy)-3,3,5-trimethylcyclohexane, tert-amyl peroxy-2-ethylhexyl carbonate, di-tert-butyl peroxide, tert-amyl peroxybenzoate, di-tert-amyl peroxide, N-butyl-4,4-di(tert-butylperoxy) valerate, 1,2-dimethylproplyidene dihydroperoxide and methyl isopropyl ketone peroxide or any mixture of two or more thereof.

12. A resin film according to claim 10 wherein the at least one peroxide curing agent is present in a concentration of from 0.1 to 3 parts per hundred based on the weight of the polymerizable vinyl ester prepolymer.

13. A resin film according to claim 10 wherein the free-radical curing system further comprises a first auxiliary curing agent comprising a transition metal complex or a transition metal ligand, and wherein in the first auxiliary curing agent the transition metal comprises copper or iron.

14. A resin film according to claim 13 wherein the first auxiliary curing agent is present in a concentration of from 0.05 to 3.0 parts per hundred based on the weight of the polymerisable vinyl ester prepolymer.

15. A resin film according to claim 10 wherein the free-radical curing system further comprises a second auxiliary curing agent comprising at least one of an aliphatic dione and a nitrogen-containing aliphatic or aromatic compound, the nitrogen-containing aliphatic or aromatic compound optionally comprising a substituted or unsubstituted acetamide, aniline or toludine, and wherein the aliphatic dione comprises 2,4-pentane dione, ethyl acetoacetate, N,N-diethylacetoacetamide, 3-methyl-2,4-pentanedione, or 3-ethyl-2,4-pentanedione, or any mixture of any two or more thereof, and/or the nitrogen-containing aliphatic or aromatic compound comprises N,N-diethylacetoacetamide, 4,N,N-trimethyl aniline, N,N-diethylaniline or ethoxylated-para-toluidine, or any mixture of any two or more thereof.

16. A resin film according to claim 15 wherein the second auxiliary curing agent is present in a concentration of from 0.05 to 3.0 parts per hundred based on the weight of the at least one polymerisable vinyl ester prepolymer.

17. A resin film according to claim 10 wherein the free-radical curing system further comprises a curing inhibitor comprising 10H-phenothiazine, and wherein the curing inhibitor is present in a concentration of from 0.01 to 1.0 parts per hundred based on the weight of the polymerisable vinyl ester prepolymer.

18. A resin film according claim 1 wherein the resin film is a coherent layer having first and second opposed resin surfaces, optionally which are self-adhesive.

19. A resin film according to claim 1 wherein the resin film has first and second opposed resin surfaces and is supported on a lightweight textile sheet to which the first opposed resin surface is adhered, and wherein the lightweight textile sheet has an areal weight of from 1 to 75 grams per square metre (gsm).

20. A resin film according to claim 18 wherein the second opposed resin surface is releasably adhered to a release backing layer.

21. A resin film according to claim 1, wherein the polymerisable resin has a storage modulus and a loss modulus which are equal within a temperature range of from 70 to 110° C., measured using a dynamic oscillatory measurement within a temperature range of 30 to 130° C. at a strain of 0.125% and ramp rate of 1° C.

22. A resin film according to claim 1 wherein the polymerisable resin has a minimum viscosity within a temperature range of from 75 to 100° C., measured using a dynamic oscillatory measurement within a temperature range of 30 to 130° C. at a strain of 0.125% and ramp rate of 1° C.

23. A resin film according to claim 1 wherein the at least one polymerisable vinyl ester prepolymer of the polymerisable resin, in the absence of any curing system for polymerizing the polymerisable vinyl ester prepolymer, has a viscosity within the range of 30 to 100 Poise at a temperature of 85° C., measured using a CAP viscometer from AMETEK Brookfield at a shear rate of 0.5-12 $s^{-1}$.

24. A resin film according to claim 1 wherein the polymerisable resin is free of any particulate filler and/or free of any solvent for the at least one polymerisable vinyl ester prepolymer, and/or the polymerisable resin consists of the at least one polymerisable vinyl ester prepolymer and a free-radical curing system for polymerizing the polymerisable vinyl ester prepolymer.

* * * * *